United States Patent
Comer et al.

[19]

[11] Patent Number: 6,038,989
[45] Date of Patent: Mar. 21, 2000

[54] TURF INJECTOR WITH GROUND SLITTING KNIVES

[75] Inventors: Robert C. Comer, Lilydale; David J. Scherbring, Shakopee, both of Minn.

[73] Assignee: The Toro Company, Minneapolis, Minn.

[21] Appl. No.: 09/070,194

[22] Filed: Apr. 30, 1998

[51] Int. Cl.[7] ................................................. A01C 23/02
[52] U.S. Cl. ............................................................. 111/123
[58] Field of Search .................................. 111/123, 156, 111/154; 172/13, 14, 16, 19, 190, 192, 702–704, 725, 729, 735, 737, 744, 762, 764, 772, 772.5

[56] References Cited

U.S. PATENT DOCUMENTS

| | | | |
|---|---|---|---|
| 3,533,366 | 10/1970 | Francom | 111/80 X |
| 3,618,538 | 11/1971 | Brannan | 111/80 X |
| 3,707,132 | 12/1972 | Hansen | 172/678 X |
| 3,793,967 | 2/1974 | van den Berg | 111/123 |
| 3,834,330 | 9/1974 | Wallace | 111/123 X |
| 3,877,401 | 4/1975 | Gutman | 111/123 |
| 4,538,532 | 9/1985 | Coker | 172/166 X |
| 4,765,263 | 8/1988 | Wilkins | 111/123 X |
| 4,825,782 | 5/1989 | Mikkelsen | 111/123 |
| 4,947,770 | 8/1990 | Johnston | 111/123 X |

FOREIGN PATENT DOCUMENTS

| | | | |
|---|---|---|---|
| 1270715 | 7/1961 | France | 111/123 |
| 1423796 | 11/1965 | France | 111/123 |
| 1574412 | 9/1980 | United Kingdom | 111/123 |

*Primary Examiner*—Christopher J. Novosad
*Attorney, Agent, or Firm*—James W. Miller

[57] ABSTRACT

A turf injector includes a plurality of slitting knives followed by a plurality of nozzles for injecting chemicals into the ground. Each slitting knife is reversible to bring one of two longitudinally extending cutting edges into use, thereby extending the life of the knife. In addition, each slitting knife has dual sets of mounting holes received on a set of fixed mounting pins to further adjust the vertical position of each knife on the frame. This allows for wear of the cutting edge of the blade and further extends the life of the blade. The hole and pin mounting system desirably mounts each knife with its cutting edge held at a 15° angle of inclination relative to the horizontal to minimize disruption of the turf and the length of the knife.

10 Claims, 3 Drawing Sheets

TURF INJECTOR WITH GROUND SLITTING KNIVES

TECHNICAL FIELD

This invention relates to a turf injector for applying chemicals, such as fertilizer, into the ground. More particularly, this invention relates to such an injector having a plurality of knives that cut slits into the ground with the chemicals being injected into the slits.

BACKGROUND OF THE INVENTION

Turf injectors are known for applying chemicals, such as fertilizer or the like, into the ground to provide nutrients for vegetation such as grass. One type of such injector that is known includes a frame that is movable over the ground. The frame includes a plurality of injector units each of which includes a knife that cuts a slit into the ground as the frame passes over the ground. A chemical applicator follows the knife. The chemical applicator typically comprises a nozzle which sprays or injects the chemical into the slit which has just been created by the knife.

In known turf injectors, the angle the slitting knife makes with the ground is often quite steep. The Applicants have discovered that such steep angles will interrupt the surface of the turf in undesirable ways. For example, if the knife angle is too steep, stolons of Bermuda grass will get torn up and piled on the surface of the turf as the knife cuts its slit. This obviously detracts from the appearance of the surface of the turf and is undesirable.

Another difficulty with known slitting knives is that they wear quite quickly during operation. They must be replaced often. The need to do so increases the costs of operating the turf injector. It would be desirable to have some type of knife design which would extend the time period between knife replacement.

SUMMARY OF THE INVENTION

One aspect of this invention is to provide a turf injector of the type that includes a frame that is movable over the ground. The frame includes at least one injector unit. Each injector unit includes a knife that cuts a slit into the ground as the frame passes over the ground and a chemical applicator following the knife for applying chemicals into the slit formed by the knife. The ground slitting knife comprises a cutting edge on the slitting knife that is inclined rearwardly and downwardly taken with respect to a forward direction of movement of the frame. A means is provided for mounting the knife on the frame at a fixed, nonadjustable angle of inclination that does not exceed approximately 15° relative to the horizontal.

Another aspect of this invention relates to the ground slitting knife and comprises two longitudinally extending cutting edges with the knife being reversible about a longitudinal axis to allow one or the other of the cutting edges to be used.

Yet another aspect of this invention relates to the ground slitting knife and comprises a cutting edge on the slitting knife. At least two longitudinally spaced apart mounting holes are received on two fixed and longitudinally spaced apart pins to fix the knife on the frame so that the angle of inclination of the cutting edge of the knife cannot be changed from that provided when the holes are engaged on the pins.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
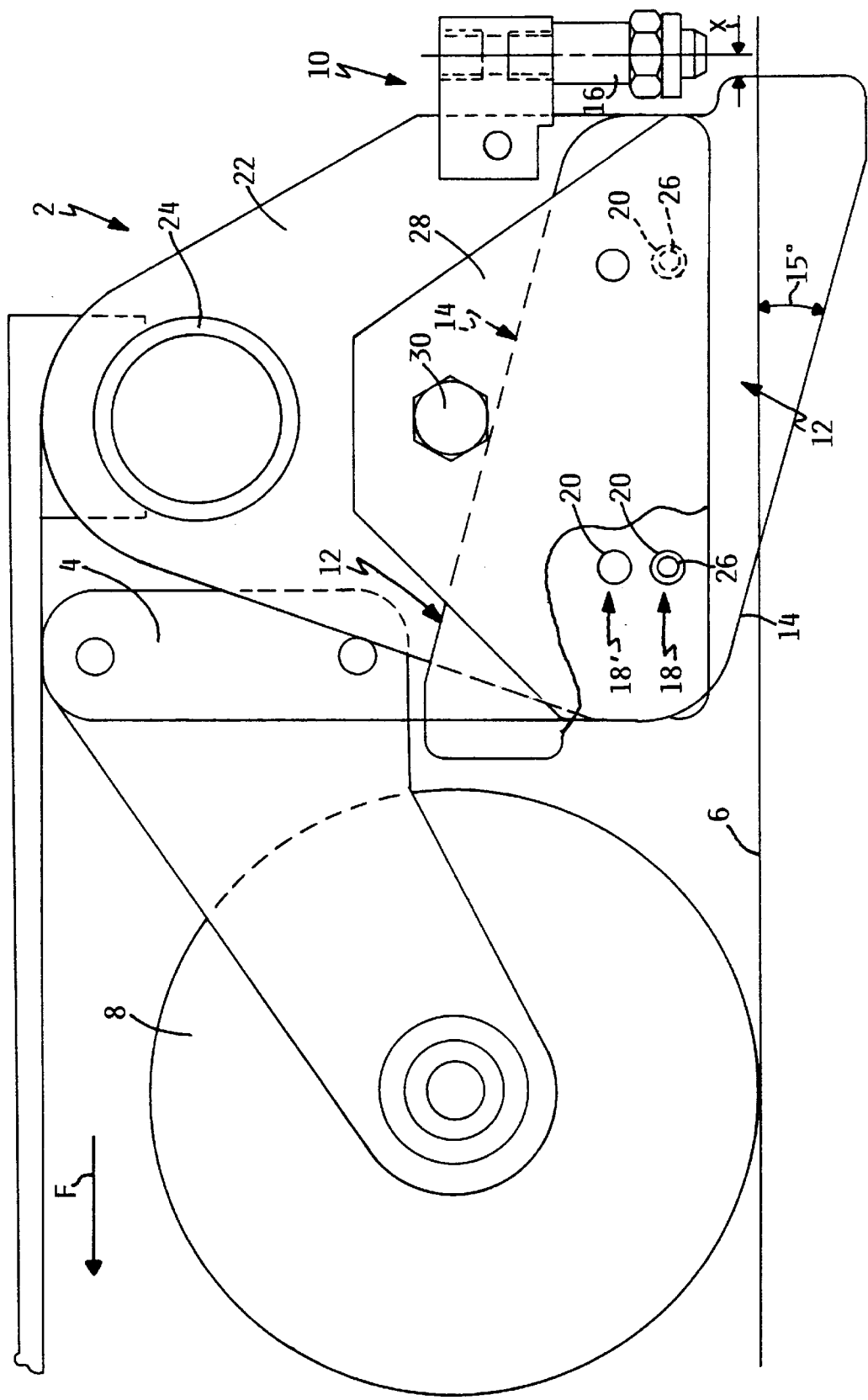
FIG. 1 is a side elevational view of a turf injector according to this invention, particularly showing the improved slitting knife of this invention mounted on the turf injector with a portion of the overlying clamping plate being broken away for the purpose of clarity.

Referring first to FIG. 1, a turf injector is illustrated generally as 2. Turf injector 2 includes a frame 4 which is supported for movement over the ground 6 by one or more ground engaging wheels 8. Frame 4 can include a tow bar such that turf injector 2 is an implement which is towed behind some type of vehicle such as a tractor. Alternatively, frame 4 can simply be part of the frame or chassis of a self-propelled vehicle. In any event, frame 4 has a forward direction of movement which is illustrated by the arrow F in FIG. 1.

Figure 2:
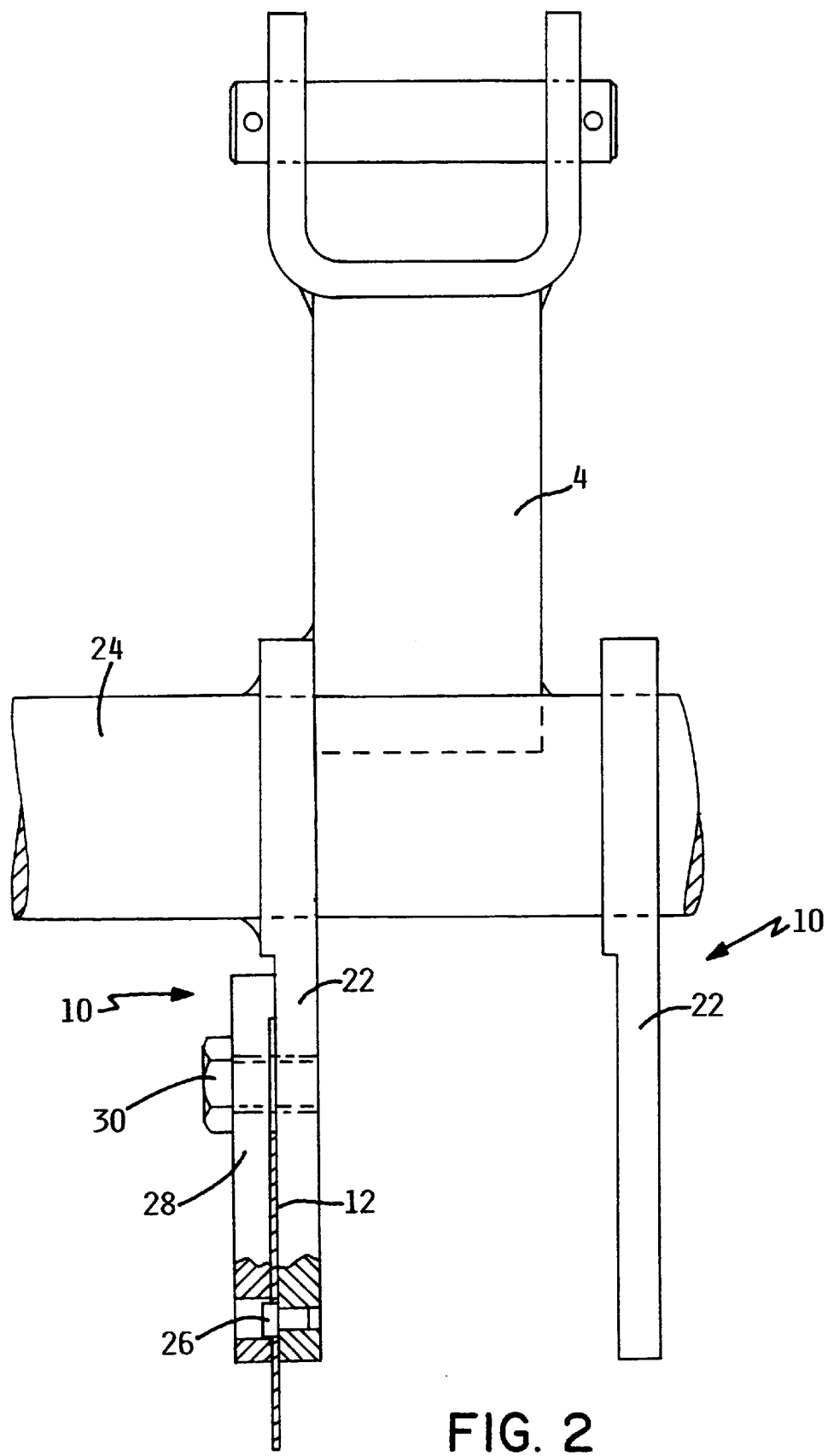
FIG. 2 is a rear elevational view of the slitting knife shown in FIG. 1, particularly illustrating the slitting knife clamped in place between the clamping plate and the base plate with a portion of the clamping and base plates being broken away for the purpose of clarity.

Frame 4 includes at least one chemical injector unit 10 carried thereon for applying chemicals into the ground. As shown in FIG. 2, a plurality of such injector units 10 can be placed across frame 4 in a side-by-side manner. Chemical injector units 10 are identical to one another. Thus, only one such chemical injector unit 10 will be described in detail.

Each chemical injector unit 10 has two major components. The first component is a slitting knife 12 which is fixed to frame 4 to extend downwardly therefrom with a cutting edge 14 of knife 12 extending below the surface of the ground 6. Preferably, knife 12 extends to a depth of 1" below the surface of the ground 6. The second component of chemical injector unit 10 is a downwardly facing nozzle 16 which is fixed to frame 4 and follows closely behind slitting knife 12. Nozzle 16 is spaced closely above the surface of the ground 6.

A supply of chemicals, preferably in liquid form, is carried in a tank (not shown) provided on frame 4. Fluid supply lines connect each nozzle 16 to the tank to allow nozzles 16 to apply or dispense the chemicals carried in the tank to the ground. Any appropriate control means may be used during movement of frame 4 over the ground 6 to allow nozzles 16 to spray the chemicals downwardly so that such chemicals enter the slit in the surface of the ground 6 which has been formed by the immediately preceding slitting knife 12. As described thus far, chemical injector unit 10 comprising a knife 12 for forming a slit in the surface of the ground 6 followed by a nozzle 16 for applying a chemical into the slit formed by knife 12 is well known in the agricultural and related arts.

Figure 3:
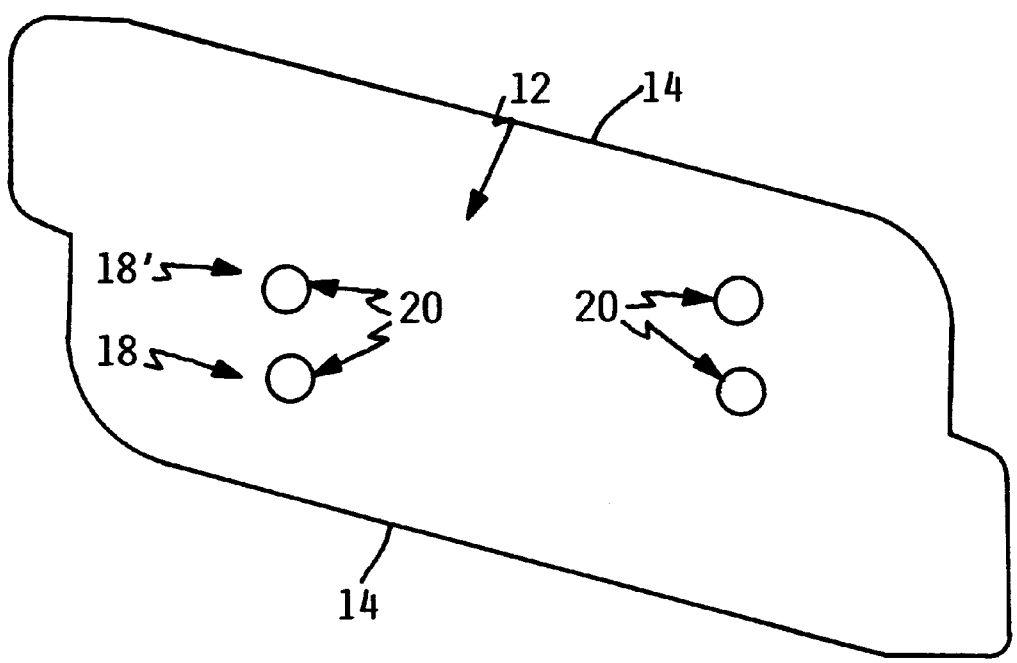
FIG. 3 is a top plan view of the slitting knife of this invention.

Referring now to FIG. 3, each slitting knife 12 is shaped to have two cutting edges 14 and to be reversible. When one cutting edge 14 wears out, knife 12 can be flipped over about a longitudinal axis extending through knife 12 to allow the other cutting edge 14 to be used. Each cutting edge 14 when in use is inclined downwardly and rearwardly at an angle of approximately 15° relative to a horizontal line passing through cutting edge 14. This angle has been discovered by the Applicants to be important as will be described below.

The central portion of each slitting knife 12 includes a first set is of mounting holes 20 which are longitudinally spaced apart relative to each other but are at the same elevation with respect to one another. A second set 18' of mounting holes 20 are located above the first set 18. The dual sets 18 and 18' of mounting holes 20 allows knife 12 to have its vertical position adjusted on frame 4 to compensate for wear in cutting edge 14. When both sets 18 and 18' of holes have been used, however, and cutting edge 14 is completely worn, then knife 12 can be flipped over and the other cutting edge 14 brought into use. Again, both sets 18 and 18' of holes 20 can be used with respect to this cutting edge 14 to compensate as this second cutting edge 14 begins to wear.

A means is provided for rigidly mounting each knife to frame 4 such that knife 12 is fixed and non-movable to frame 4 during use. The mounting means for each knife 12 comprises a base plate 22 that extends downwardly from frame 4 by being welded or otherwise fixedly secured to a transverse tube 24 of frame 4. Base plate 22 contains two pins 26 extending to one side which are spaced apart at the same distance as holes 20 in the two sets 18 and 18' of mounting holes 20 in knife 12. Knife 12 is supported on pins 26 on base plate 22 simply by placing one set 18 or the other set 18' of mounting holes 20 over pins 26.

When so installed, pins 26 in conjunction with mounting holes 20 are configured to keep the inclined cutting edge 14 of knife 12 at the preferred 15° angle relative to the horizontal without their being any possibility of knife 12 loosening and changing its angle. Because the two pins 26 are longitudinally spaced apart and fit into the two longitudinally spaced apart holes 20 in each set 18 and 18' on knife 12, the pin/hole mounting structure will not permit any inadvertent twisting or pivoting of knife 12 that might potentially change the angle of cutting edge 14.

To retain or hold knife 12 on base plate 22, the mounting means further includes an overlying clamping plate 28 that is abutted against the other side of knife 12. Clamping plate 28 is held to base plate 22 by a securing bolt 30 which when tightened causes knife 12 to be tightly clamped between clamping plate 28 and base plate 22. Clamping plate 28 includes two spaced apertures 32 which fit over and provide clearance for the two pins 26 used to mount knife 12 on base plate 22.

One aspect of this particular mounting system is that knife 12 will not change its orientation on frame 4 even if clamping plate 28 should loosen somewhat on base plate 22. Even assuming securing bolt 30 becomes somewhat loose during operation of turf injector 2, the orientation of knife 12 still will not change relative to frame 4 due to the pin/hole connection system described earlier. Thus, the 15° angle of the inclined cutting edge 14 to the horizontal will be maintained. Moreover, to tighten clamping plate 28 on frame 4, only the single securing bolt 30 must be tightened as the holes in knife 12 simply rest on pins 26 provided in base plate 22.

Assuming turf injector 2 is placed in use with knife 12 shown in its position of FIG. 1, knife 12 is fixed to frame 4 using the first set 18 of mounting holes. As cutting edge 14 of knife 12 wears down a predetermined amount, i.e. ½", so that cutting edge 14 now extends down into the ground 6 only ½" instead of the 1" that is preferred, clamping plate 28 can be loosened or removed from base plate 22 by removing bolt 30. Knife 12 can then be dropped down on frame 4 with the upper set 18' of mounting holes 20 now being placed on pins 26. Clamping plate 28 can then be retightened or reinstalled. Thus, the first cutting edge 14 of knife 12 can continue to be used for some additional time, at least until another ½" or so of cutting edge 14 is worn off.

At this point when first cutting edge 14 has a worn a total of 1", clamping plate 28 can again be released to free knife 12. However, knife 12 is now flipped completely over to bring the second cutting edge 14 into use. Initially, knife 12 will be installed with the set 18' of mounting holes 20, which is now the lowermost set of mounting holes after knife 12 is flipped over, placed over pins 26 in base plate 22. This allows the second cutting edge 14 to wear over an initial ½" or so. At this point, knife 12 can be adjusted downwardly so that set 18 of mounting holes 20 is now used, thereby to gain a final increment of use, i.e. a final ½" of wear, out of the second cutting edge 14.

Knife 12 of this invention provides 4 times the wear of a knife having only a single cutting edge 14 and a single set 18 or 18' of mounting holes 20. Thus, the time between knife replacement is greatly increased, thereby decreasing the costs of operating turf injector 2.

The Applicants have discovered that the angle of inclination of cutting edge 14 of knife 12 should not exceed approximately 15°. The Applicants have discovered that steeper angles lead to surface disruption when cutting slits in grass. At angles much greater than 15°, forward movement of knife 12 would tear up stolons of Bermuda grass and pile them on the surface of the grass. The Applicants have discovered that this does not happen when the angle of knife inclination was 15° or less.

While angles of inclination of 15° or less minimized surface disruption of the turf, angles much shallower than 15° unduly lengthened knife 12 in order to attain a depth of 1". Accordingly, a cutting edge angle of 15° was found to be optimum in providing a knife 12 which worked well without disrupting the surface of the turf but was not unduly long even though an initial penetration depth of 1" was achieved. This initial depth of penetration is preferred as it has been found by the Applicants to be effective for mole cricket killing when the chemicals being injected into the ground 6 also contain some pesticide ingredients.

Frame 4 desirably includes some means for applying a downward force on the rear portion of frame 4, i.e. on that portion of frame 4 having the slitting knives 12 to keep such knives 12 firmly penetrated beneath the surface of the ground 6. For example, any tank containing a supply of liquid chemicals might be positioned over slitting knives 12 such that the weight of the chemicals helps supply this downward force. Alternatively, various types of springs (not shown) might be used for keeping the slitting knives 12 penetrated beneath the surface of the ground 6.

In addition, cutting edge 14 of each knife 12 can include a sharpened surface to facilitate cutting the necessary slit in the surface of the ground 6. Each such sharpened surface could extend upwardly from the edge 14 of knife 12 a sufficient distance such that the sharpened surface would still be present and be effective even when knife 12 was mounted on base plate 22 using the higher set 18 or 18' of mounting holes.

When turf injector 2 applies chemicals to turf comprising grass or similar vegetation, the distance between the centerline of nozzle 16 and the rear vertical surface of knife 12 at the level of the ground 6, which distance is indicated as x in FIG. 1, is important. The Applicants have discovered that this distance should not exceed approximately ½" as the resilience of the turf causes the slit formed by knife 12 to close. Nozzle distances x of approximately ½" or less will ensure that the chemicals will be properly applied by nozzle 16 to the slit before closure begins. The distance x should not be so small, however, that the spray from nozzle 16 hits or impinges on the rear of knife 12. The Applicants have discovered that a distance x of approximately ³⁄₁₆ of an inch give good results.

Moreover, the height of nozzle 16 above the ground 6 should be minimized as much as possible. Because a grassy turf surface is not perfectly plain or flat, nozzle 16 must be sufficiently high so as not to hit the ground given the normal types of undulations that can be found in a grassy turf surface. The Applicants have discovered that spacing the nozzle 16 approximately ½" above the ground gives good results.

Various modifications of this invention will be apparent to those skilled in the art. For example, while a penetration depth of 1" for knife 12 is preferred, the penetration depth being the distance between the ground 6 and the lowermost flat on knife 12 that trails cutting edge 14, knife 12 can be designed to reach other penetration depths. Applicants have used knife 12 of the type shown herein to reach a penetration depth of 2.5" or so.

The preferred 15° angle of inclination of cutting edge 14 to the horizontal is preferred as noted above because keeping the angle of inclination at approximately that value or less has been found to prevent any significant disruption of the turf surface. However, if disruption of the turf surface can be tolerated to some degree, then angles of inclination of cutting edge 14 above 15° can be used with the understanding that as the angle progressively increases the amount of surface disruption will increase. Angles of inclination up to 25° can be tolerated, but angles of inclination above this level should not be used as turf surface disruption becomes unacceptable.

Thus, the scope of this invention is to be limited only by the appended claims.

We claim:

1. A turf injector that includes a frame that is movable over the ground, wherein the frame includes at least one injector unit, wherein the at least one injector unit includes a knife that cuts a slit into the ground as the frame passes over the ground and a chemical applicator following the knife for applying chemicals into the slit formed by the knife, wherein the improvement relates to the ground slitting knife and comprises:
    a cutting edge on the slitting knife that is inclined rearwardly and downwardly taken with respect to a forward direction of movement of the frame, and means for mounting the knife on the frame at a fixed, non-adjustable angle of inclination relative to the horizontal, wherein the knife mounting means comprises at least two longitudinally spaced apart mounting holes received on two fixed and longitudinally spaced apart pins so that the angle of inclination of the cutting edge of the knife cannot be changed, wherein the mounting holes are provided on the knife and the pins are fixed to the frame, wherein the pins are carried on a base plate fixed to the frame, and further including a clamping plate secured to the base plate for clamping the knife in place against the base plate with the knife being received between the base plate and the clamping plate.

2. The turf injector of claim 1, wherein the knife mounting means includes a second set of holes or pins to allow the vertical position of the knife on the frame to be changed to compensate for wear of the cutting edge, wherein the second set of holes or pins is vertically offset relative to the first set of holes or pins and are configured relative to the first set of holes or pins to keep the angle of inclination of the cutting edge the same as when the first set of holes or pins is being used.

3. The turf injector of claim 2, wherein the knife has two longitudinally extending cutting edges with the knife being reversible about a longitudinal axis to allow one or the other of the cutting edges to be used.

4. The turf injector of claim 1, wherein the knife has two longitudinally extending cutting edges with the knife being reversible about a longitudinal axis to allow one or the other of the cutting edges to be used.

5. The turf injector of claim 1, wherein the knife is mounted on the frame such that the angle of inclination of the cutting edge does not exceed approximately 25° relative to the horizontal.

6. The turf injector of claim 5, wherein the knife is mounted on the frame such that the angle of inclination of the cutting edge does not exceed approximately 15° relative to the horizontal.

7. A turf injector that includes a frame that is movable over the ground, wherein the frame includes at least one injector unit, wherein the at least one injector unit includes a knife that cuts a slit into the ground as the frame passes over the ground and a chemical applicator following the knife for applying chemicals into the slit formed by the knife, wherein the improvement relates to the ground slitting knife and comprises:
    two longitudinally extending cutting edges with the knife being reversible about a longitudinal axis to allow one or the other of the cutting edges to be used, wherein each cutting edge is inclined rearwardly and downwardly taken with respect to a forward direction of movement of the frame when such cutting edge is in use.

8. The turf injector of claim 7, wherein the knife is mounted on the frame such that the angle of inclination of the cutting edge that is in use does not exceed approximately 15° relative to the horizontal.

9. The turf injector of claim 7, wherein the knife is mounted on the frame in a fixed, non-adjustable manner to ensure that the angle of inclination of the cutting edge cannot change during use even if the knife should become loose on the frame.

10. The turf injector of claim 7, wherein the knife is mounted on the frame such that the angle of inclination of the cutting edge does not exceed approximately 25° relative to the horizontal.

\* \* \* \* \*